(12) United States Patent
Gasteyer, III et al.

(10) Patent No.: US 6,543,251 B1
(45) Date of Patent: Apr. 8, 2003

(54) DEVICE AND PROCESS FOR GENERATING CARBON DIOXIDE SNOW

(75) Inventors: Theodore Hall Gasteyer, III; Yeu-Chaun Simon Ho; Gary Dee Lang, all of Naperville; Steven Michael McCarty, Glendale Heights, all of IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/978,067

(22) Filed: Oct. 17, 2001

(51) Int. Cl.7 .................................................. F25J 1/00
(52) U.S. Cl. ....................................................... 62/603
(58) Field of Search ........................................... 62/603

(56) References Cited

U.S. PATENT DOCUMENTS

| | | | | |
|---|---|---|---|---|
| 3,932,155 A | * | 1/1976 | Pietrucha et al. | 62/603 |
| 4,111,671 A | | 9/1978 | Williamson | 62/10 |
| 4,404,818 A | * | 9/1983 | Franklin, Jr. | 62/603 |
| 4,444,023 A | | 4/1984 | Barbini et al. | 62/330 |
| 4,652,287 A | | 3/1987 | Allen et al. | 62/35 |
| 5,450,732 A | | 9/1995 | Venetucci | 62/374 |
| 5,775,127 A | * | 7/1998 | Zito | 62/603 |
| 5,868,003 A | | 2/1999 | Simas et al. | 62/603 |
| 6,000,238 A | | 12/1999 | Hollingshead | 62/603 |
| 6,023,941 A | | 2/2000 | Rhoades | 62/603 |
| 6,151,913 A | | 11/2000 | Lewis et al. | 62/603 |
| 6,173,916 B1 | | 1/2001 | Krone-Schmidt | 239/590.3 |

FOREIGN PATENT DOCUMENTS

| | | |
|---|---|---|
| EP | 0721801 | 2/1999 |

* cited by examiner

*Primary Examiner*—Ronald Capossela
(74) *Attorney, Agent, or Firm*—Donald T. Black

(57) ABSTRACT

A device useful for delivering carbon dioxide snow comprises a supply conduit for providing a flow of pressurized carbon dioxide, a plurality of tubes disposed side by side, each tube having a constant cross-sectional configuration and area throughout its length, each tube having a first end the peripheral edges of which are sealed to the outside of the conduit wall and a second end which is open to the ambient atmosphere, and a plurality of apertures for carbon dioxide to flow through the conduit wall and expand to solids and vapor, there being at least one aperture communicating with the interior of each of said plurality of tubes.

8 Claims, 2 Drawing Sheets

DEVICE AND PROCESS FOR GENERATING CARBON DIOXIDE SNOW

FIELD OF THE INVENTION

The present invention relates to applying solid carbon dioxide snow onto an object (such as a product to be chilled or frozen, or a belt of a refrigeration device for carrying out such chilling or freezing).

BACKGROUND OF THE INVENTION

Typically, application of $CO_2$ snow is accomplished through a device called a snow horn. Snow horns usually are loud, fairly large devices that typically need to be operated in a vertical orientation and typically are subject to plugging and non-uniform flow. The flow from typical snow horns can be difficult to distribute uniformly across a wide array of products or a wide belt.

Snow is applied onto a belt to prevent product from sticking to the belt and to provide refrigeration. The product to be chilled or frozen is typically dropped onto the belt downstream of the snow horn. The height of the snow horn usually determines how far the product drops before it comes in contact with the snow on the belt. As it is desirable to minimize the distance through which the product is dropped, it is desirable to minimize the size of the snow horn.

The prior art describes other attempts to form and agglomerate carbon dioxide snow using a snow horn.

U.S. Pat. No. 4,111,671 describes a method and apparatus for separating $CO_2$ snow from a mixture of snow and vapor. The method consists of expanding liquid $CO_2$ into a rectangular conduit of continuously increasing cross section to create a flow of solid and vapor $CO_2$ in the conduit, conducting this flow around a curve, and separating the snow on the outer edge of the curve by a physical separation barrier. The apparatus for separating the snow consists of a rectangular conduit of continuously increasing cross section, means for introducing mixture of $CO_2$ snow and vapor, conduit having a curved section to concentrate the solid $CO_2$, and a blade for separating the concentrated solid from the vapor.

U.S. Pat. No. 4,444,023 discusses a horn design wherein liquid $CO_2$ is expanded into a curved horn of increasing rectangular cross section. The horn has an opening to atmosphere on the inner curved surface. The solid $CO_2$ travels along the outer portion of the curve and the pressure differential created by the opening to atmosphere causes the solid $CO_2$ to be spread evenly along the outer curved surface. Ribbons of solid $CO_2$ are discharged from the horn in a uniform pattern for application typically on a belt.

U.S. Pat. No. 4,652,287 discusses a rectangular horn/injector design for producing a uniform flow of solid $CO_2$ over a rectangular area. The liquid $CO_2$ is injected in the upper region of the horn and expanded in a funnel section. Baffles are provided in the upper section that separate the $CO_2$ injectors and cause the resulting solid $CO_2$ to fall generally downward and uniformly through out the cross sectional area of the horn.

U.S. Pat. No. 5,450,732 discusses an apparatus for distributing cryogen onto a belt. It is composed of a closed housing (either circular or rectangular in cross section) with a slot across the length of the housing for forming and distributing a curtain of cryogen onto a product to be frozen. Cryogen is injected into a manifold mounted in and axial to the housing. The cryogen is injected in all directions radially through a plurality of apertures in the manifold or a sintered metal tube.

U.S. Pat. No. 6,000,238 discusses a device for carbon dioxide snow blanketing. The device includes a housing with at least one passageway for delivering $CO_2$. Where one end of the passageway is connected to a carbon dioxide generator and the other end is placed over the substrate onto which $CO_2$ snow is to be deposited. A means for heating the passageways is provided to prevent the solid $CO_2$ from adhering to the walls and plugging up the passageway is provided.

U.S. Pat. No. 6,023,941 discusses a carbon dioxide snow horn that operates either vertically or horizontally and can be adjusted to produce different consistency $CO_2$ snow. The basic apparatus contains an inlet tube for receiving liquid $CO_2$, an outlet tube for dispensing solid $CO_2$, and a porous member located either within or at the end of the inlet tube for the expansion of the liquid $CO_2$ into solid and vapor.

U.S. Pat. No. 6,151,913 discusses a method and apparatus for agglomeration of fine snow particles. The device includes an individual snow horn connected to an expansion device with multiple fine channels. The horn agglomerates the flow from the expansion device.

European patent application EP 0721801 discloses a jet spray nozzle configured and operated to propel particles of solid $CO_2$ out of the nozzle onto a surface at sufficiently high velocity to dislodge even minute contaminants from the surface, thereby cleaning the surface. The difference between this disclosure and the present invention is comparable to the difference between a particle beam gun and a snowmaking machine.

BRIEF SUMMARY OF THE INVENTION

One aspect of the present invention is a device useful for delivering carbon dioxide snow, comprising a supply conduit for providing a flow of pressurized carbon dioxide, the conduit having an axis and a wall extending along and surrounding said axis;

a plurality of tubes disposed side by side, each tube having a constant cross-sectional configuration and area throughout its length, each tube having a first end the peripheral edges of which are sealed to the outside of the conduit wall and a second end which is open to the ambient atmosphere, wherein the axis of each tube at least at said first end is perpendicular to said conduit axis;

a plurality of apertures through the conduit wall, there being at least one aperture communicating with the interior of each of said plurality of tubes;

the apertures being dimensioned to enable pressurized carbon dioxide to flow therethrough from the conduit interior into a corresponding tube and to expand to solid carbon dioxide and carbon dioxide vapor; the tubes being dimensioned in length and width so that said solid carbon dioxide agglomerates in the tube into snow.

Another aspect of the present invention is a method of providing carbon dioxide snow, comprising supplying a pressurized flow of liquid carbon dioxide into the conduit of the aforementioned device, whereupon the carbon dioxide flows through said apertures and expands to form solid carbon dioxide and carbon dioxide vapor in said tubes, and said solid carbon dioxide agglomerates in said tubes into snow.

A further aspect of the invention comprises applying the carbon dioxide snow thus formed onto an article or surface.

DETAILED DESCRIPTION OF THE INVENTION

This invention deals with the process and apparatus for expansion of liquid carbon dioxide (typically at a pressure of up to 300 psig and a temperature of 0 degrees F. or lower) to ambient pressure where it exists as a solid vapor mixture, and the agglomeration of the solid into snow, making possible the uniform application of the agglomerated snow onto a surface.

Figure 1:
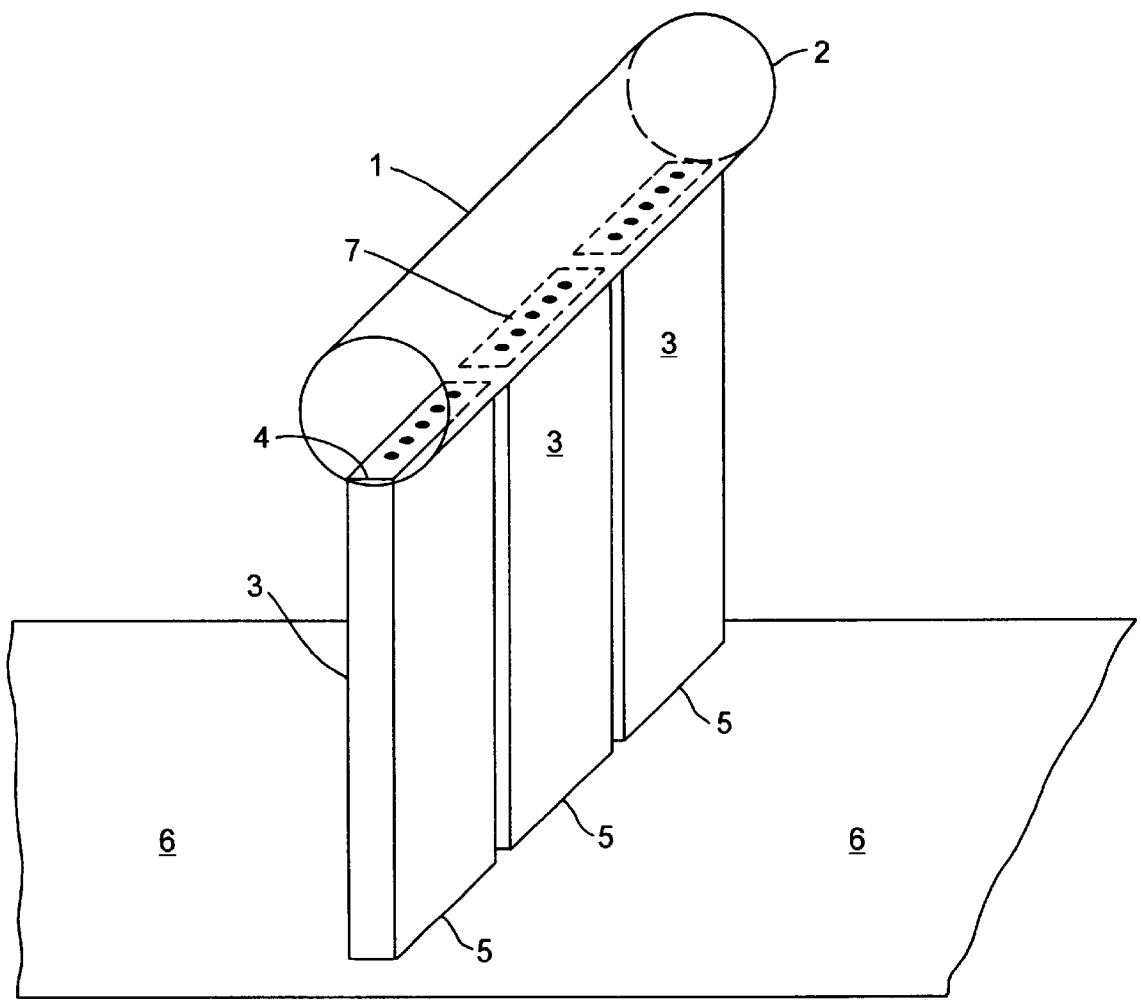
FIG. 1 is a view showing one embodiment of the invention.

Referring first to FIG. 1 the device includes a supply conduit 1 for providing a pressurized flow of liquid carbon dioxide to the device. Conduit 1 has an inside diameter and a wall 2 having a thickness, and extends along an axis. It should be made of a material capable of withstanding the pressure of the carbon dioxide within conduit 1. The preferred material of construction is stainless steel. Other suitable materials include other metals such as copper and aluminum.

Suitable dimensions of the conduit include an inside diameter of ¼ in to 2 in and a wall thickness of about 0.028 in to about 0.065 in. The preferred outside diameter is ⅝ in and the preferred wall thickness is about 0.049 in.

One end of conduit 1 is connected to a suitable source (not shown) of liquid carbon dioxide under high pressure, such as a cylinder or a storage tank. Preferably a pump is provided in the line connecting the source to conduit 1, to ensure that a suitably high pressure and good flow distribution are maintained. Preferably the pressure of the liquid carbon dioxide entering the conduit is up to about 320 psig. The pressure of the carbon dioxide in conduit 1, to procure the desired performance of the device, should be at least 100 psig and preferably at least 150 psig. Preferably the pressure is 280 to 320 psig and more preferably about 300 psig.

The other end of conduit 1 can be capped or can feed on to another device or application. In practice, for instance in a freezer, rotary drum chiller, or other like application, the conduit 1 can be held in place with suitable connecting brackets and the like with which the operator is conventionally familiar.

Extending from conduit 1 are a plurality of tubes 3. The tubes are arranged side by side. The axes of flow of carbon dioxide snow, at least where the carbon dioxide emerges from conduit 1, are parallel and are perpendicular to the axis of the conduit 1.

Each tube 3 has an end 4 whose peripheral edges are sealed to the outside wall of conduit 1. This sealing connection can be achieved by welding, brazing, or the like, provided that there is no opportunity for carbon dioxide to escape around the joint where end 4 meets conduit 1. In addition, the manner of sealing end 4 to conduit 1 must be capable of withstanding the pressures and temperatures to which the interior of tube 3 will be exposed in operation.

Each tube 3 has a second end 5, which is open to the ambient atmosphere.

The tubes 3 have constant cross-sectional configurations and constant cross-sectional areas. In FIG. 1, the cross-sectional configuration is rectangular, which is preferred because of ease of construction and efficiency of operation. The rectangular shape can have squared-off corners, as shown, or can have curved corners of small radius., Other useful cross-sectional configurations include circular, elliptical, oval and square.

It has been determined that the aspect ratio (which as used herein is the maximum inside tube width divided by the minimum inside tube width) of each tube 3 should be 1 to 10. The preferred aspect ratio is 5. If the aspect ratio is too high, flow recirculation develops which can lead to plugging or flow instability. To overcome this problem, multiple separate tubes 3 are used so that the aspect ratio does not become too high. Having multiple tubes is also advantageous from the view of plugging. If only one tube plugs the rest of the tubes are not affected by this and could continue to operate normally.

It has also been found that the length of each of the tubes 3 should be 2–24 in and preferably 6–10 in.

The tubes 3 preferably are constant area tubular members with a ratio of length (that is, length in the axial direction along which the carbon dioxide flows) to equivalent diameter (that is, the diameter of a circle having t he s same area as the cross-sectional area of the tube) greater than about 3 and less than 50, and more preferably about 3 to about 15. The tubular members are typically rectangular in cross-section.

Figure 3:
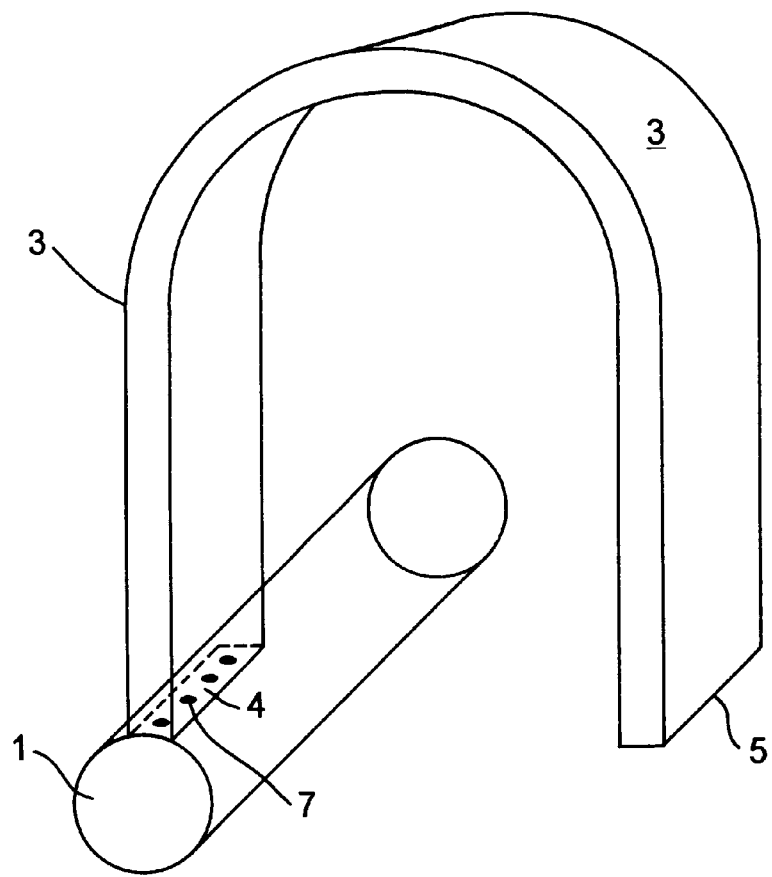
FIG. 3 is a perspective view of another embodiment of the invention.

For more efficient operation, all of the tubes 3 of a given device would have the same area and length, so as to ensure uniform deposition of carbon dioxide snow to a surface. However, there could be applications in which one or more tubes might be longer, where a less uniform deposition profile is desired. The shape of the tubes 3 can be straight, as shown in FIG. 1, or can be curved as shown in FIG. 3, or spiraled with increasing area. The straight constant area tube is believed to be the best mode due to its simplicity and availability. The tubes 3 can be positioned so that they are perpendicular to the surface 6 which will receive the snow, as shown in FIG. 1, or the tubes 3 can be positioned at a more acute angle (not shown) so that the direction in which the snow emerges from the openings 5 forms an acute angle to the surface of the belt 6.

Preferably, each tube 3 communicates with the same number and arrangement of apertures 7 to achieve uniform formation and deposition of snow onto the surface of belt 6. It will be recognized that articles such as pieces of food, packages, or other items can be passed under the openings 5 to receive the snow. If desired the tubes 3 can be lined up to extend over the entire width of the belt 6.

Referring again to FIG. 1, a plurality of apertures 7 extend through the wall of conduit 1. The apertures are narrow passages through which the carbon dioxide passes, undergoing pressure reduction as it passes through so that the carbon dioxide emerging from the apertures outside conduit 1 includes fine solid particles and vapor.

The preferred method for forming the apertures is by laser drilling, using conventional microdrilling equipment and techniques. The apertures should be 0.005 to 0.040 inches in diameter and preferably greater than 0.005 in up to 0.015 or 0.020 in. The preferred diameter is 0.010 inches.

Figure 2:
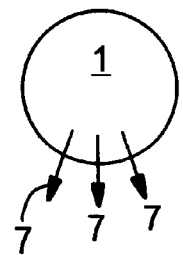
FIG. 2 is a cross-section view of one embodiment of a feed conduit used in the invention.

The apertures are located so that there is at least one aperture communicating with the interior of each tube 3. While up to 200 apertures per corresponding tube can be used, 5 to 24 apertures per associated tube are preferred. In the embodiment of FIG. 1, there are 5 apertures per tube. Other arrangements are useful as well, including arrangements wherein there are 2 or more rows of apertures communicating into a tube instead of the one row shown in FIG. 1. In particular, where more than one aperture is feeding into one tube, the apertures can be drilled to be parallel to each other, or some or even all of them can be drilled so that they diverge as shown in FIG. 2. This alternative is especially useful when there are 2 or more rows of apertures. All of the apertures are positioned on one side of the conduit 1 so that they can connect with the tubes 3 which are in side-by-side array. Preferably the axes of the apertures are parallel to the lengthwise axis of the tube along which the snow flows.

In operation, liquid carbon dioxide is flowed into conduit 1 where it reaches the apertures 7. The apertures 7 allow the expansion of the liquid carbon dioxide from roughly 300 psig or less to 0 psig. The liquid expands into vapor and solid carbon dioxide. The solid agglomerates in the tubes 3 to form larger flakes of snow that depending on the flow rate and flow area can move at a relatively low velocity, preferably less than 100 feet per second, which is desirable for uniform application of snow. The agglomerated snow is then applied onto the belt or product.

The temperature of the liquid carbon dioxide fed to the conduit is conventionally about 0 degrees F. at 300 psig. In a preferred embodiment, the temperature is colder, such as −5 to −20 degrees F. The liquid carbon dioxide can be subcooled to such temperatures by passing it through a suitable heat exchanger before it is fed to the conduit. Using such colder liquid carbon dioxide provides additional benefits to operation of this invention. In particular, the operation of the device is even quieter than the already quiet operation provided by operation with liquid carbon dioxide fed at 0 degrees F.

Superior operation (such as reduced noise) is believed to be provided by operating with liquid carbon dioxide that has been cooled sufficiently that it remains liquid throughout its passing through the apertures and begins to form solid and vapor only after it has emerged into the tubes. Liquid carbon dioxide fed into the conduit at a temperature at 300 psig of −20 degrees F. or colder is believed to perform in this way.

The device with its plurality of tubes 3 produces a very uniformly distributed snow over the area desired, such as the top surface of a conveyor belt 6 as shown in FIG. 1.

This invention provides a number of significant, unexpected advantages. It produces a high quantity of soft, low velocity, highly agglomerated $CO_2$ snow. It does this very quietly, and significantly more quietly than conventional snowing devices. It requires an overall height as small as 6 inches, so that it does not take up as much space in refrigeration and freezing units as prior devices. Its ability to generate snow is unaffected by the orientation of the tubes, thereby providing unprecedented flexibility in installing the device inside new or existing machinery for cooling and freezing articles.

The present invention provides simplicity of construction. Prior devices can contain components of specialized manufacture that are not available off the shelf. The present invention has a very simple horn geometry that can be purchased off the shelf. The horn is straight or curved and is of simple and inexpensive manufacture. The simplicity of this device means that it is easier and less expensive to build, maintain, modify, and operate than a more complicated device and should work more reliably.

The present invention provides satisfactory operation and flexibility of design in compact dimensions. Prior art snow horns are larger and generally need to be oriented vertically to operate properly. The present invention can be oriented in any position, even horizontally. This is advantageous in many applications where space is limited.

The present invention provides quieter operation compared to prior snow horns which are typically loud. The invention, with its long thin constant area horn coupled with the injection through the apertures as described herein produces very quiet injection. Having a quiet snow horn is very advantageous for the safety and comfort of the personnel who have to work near these devices.

The present invention is also less subject to plugging than prior devices for generating and applying carbon dioxide snow. The high L/D ratio coupled with the low aspect ratio of cross section and the injection across multiple fine apertures causes very uniform flow out the end and eliminates recirculation of air at the horn exit. Recirculation of air is a common cause of horn plugging, because the recirculation of air into the horn exit brings in moisture which freezes onto the inside surface of the horn. As the frozen moisture builds up on the horn it alters the flow pattern and will eventually cause either plugging or degraded horn performance. This is especially a problem for horns trying to create a low velocity snow. The uniform cross section of the tubes 3 in the present invention prevents recirculation while also providing the ability to work in any orientation. Also, due to the simple tube design, a slight purge flow of carbon dioxide vapor can be maintained on the system to prevent frost accumulation on the inside of the tube for intermittent application. This would be impossible with a standard horn design.

The present invention also permits easy, uniform application of carbon dioxide snow to a wide target area. Prior art snow horns for agglomeration of fine particles tend to produce concentrated streams of snow which are good for spot cooling applications over a localized area. These are not as well suited for uniform distribution of snow over a large area product or belt.

What is claimed is:

1. A device useful for delivering soft, low velocity, highly agglomerated carbon dioxide snow, comprising a supply conduit for providing a flow of pressurized carbon dioxide, the conduit having an axis and a wall extending along and surrounding said axis;

a plurality of tubes disposed side by side, each tube having a constant cross-sectional configuration and area throughout its length, each tube having a first end the peripheral edges of which are sealed to the outside of the conduit wall and a second end which is open to the ambient atmosphere, wherein the axis of each tube at least at said first end is perpendicular to said conduit axis wherein the length to equivalent diameter ratio of each tube is 3 to 15;

a plurality of apertures through the conduit wall, there being at least one aperture communicating with the interior of each of said plurality of tubes;

the apertures being dimensioned to enable pressurized carbon dioxide to flow therethrough from the conduit interior into a corresponding tube and to expand to solid carbon dioxide and carbon dioxide vapor; the tubes being dimensioned in length and width so that said solid carbon dioxide agglomerates in the tube into snow.

2. A device according to claim 1 wherein each tube has an aspect ratio of 1 to 10.

3. A device according to claim 1 wherein the length of each tube is 2 to 24 inches.

4. A device according to claim 3 wherein the tubes have the same length.

5. A device according to claim 1 wherein the diameter of each aperture in 0.005 to 0.020 inch.

6. A method of providing soft, low velocity, highly agglomerated carbon dioxide snow, comprising supplying a pressurized flow of liquid carbon dioxide into the conduit of a device according to claim 1, whereupon the carbon dioxide flows through said apertures and expands to form solid carbon dioxide and carbon dioxide vapor in said tubes, said solid carbon dioxide agglomerates in said tubes into snow, and said snow emerges from said tubes at a velocity of less than 100 feet per second.

7. A method according to claim 6 wherein the liquid carbon dioxide is supplied into said conduit at a pressure of 320 psig or less.

8. A method according to claim 6 wherein the liquid carbon dioxide supplied into said conduit is at a temperature of less than 0 degrees F.

* * * * *